United States Patent
Fastert et al.

(10) Patent No.: US 10,112,353 B2
(45) Date of Patent: Oct. 30, 2018

(54) ASSEMBLY AND METHOD FOR THE PRODUCTION OF A FIBER COMPOSITE WORKPIECE

(71) Applicant: Airbus Operations GmbH, Hamburg (DE)

(72) Inventors: Claus Fastert, Hamburg (DE); Hauke Seegel, Hamburg (DE); Michaela Willamowski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 305 days.

(21) Appl. No.: 14/850,252

(22) Filed: Sep. 10, 2015

(65) Prior Publication Data
US 2016/0067930 A1    Mar. 10, 2016

(30) Foreign Application Priority Data
Sep. 10, 2014  (DE) ......... 10 2014 113 069

(51) Int. Cl.
*B29C 70/54*   (2006.01)
*B29C 70/48*   (2006.01)
*B29C 33/30*   (2006.01)
*B29K 105/08*  (2006.01)

(52) U.S. Cl.
CPC .......... *B29C 70/541* (2013.01); *B29C 33/306* (2013.01); *B29C 70/48* (2013.01); *B29C 70/548* (2013.01); *B29K 2105/0809* (2013.01)

(58) Field of Classification Search
CPC ................................................. B29C 70/541
See application file for complete search history.

(56) References Cited

U.S. PATENT DOCUMENTS 5,824,249 A    10/1998  Leitch et al.

FOREIGN PATENT DOCUMENTS

| DE | 3712128 | 10/1988 |
|---|---|---|
| DE | 102007037701 | 2/2009 |
| DE | 102012000822 | 7/2013 |
| EP | 2682257 | 1/2014 |
| WO | 9731771 | 9/1997 |

OTHER PUBLICATIONS

German Search Report, dated Apr. 16, 2015.
European Search Report, dated Feb. 2, 2016.

*Primary Examiner* — Larry W Thrower
(74) *Attorney, Agent, or Firm* — Greer, Burns & Crain, Ltd.

(57) ABSTRACT

An assembly for producing a fiber composite workpiece having a base tool, including a first tool part and a second tool part, arranged relative to one another either in a closed position in which they enclose an internal space, or in an open position wherein a preform can be mounted in the internal space and maintained there in a predetermined shape. The base tool includes a connection to convey matrix material into the internal space, and has a device for holding the first and second tool parts together in a closed position. A tool insert is provided which is separate from the base tool, the tool insert being mounted in the internal space of the base tool, and the tool insert including a cavity for accommodating a preform and a shaping surface, facing the cavity, for maintaining the preform in a predetermined shape.

8 Claims, 3 Drawing Sheets

ASSEMBLY AND METHOD FOR THE PRODUCTION OF A FIBER COMPOSITE WORKPIECE

CROSS-REFERENCES TO RELATED APPLICATIONS

This application claims the benefit of the German patent application No. 10 2014 113 069.3 filed on Sep. 10, 2014, the entire disclosures of which are incorporated herein by way of reference.

BACKGROUND OF THE INVENTION

The present invention relates to an assembly for the production of a fiber composite workpiece, having a base tool and having a holding device, which is designed to hold the base tool in a closed position. In particular, the assembly is suited to the production of a fiber composite workpiece using a Resin Transfer Molding (RTM) process or a similar process, wherein a preform made of fiber fabric is held in a certain shape in a base tool, whereupon matrix material, in particular a plastic resin, is introduced into the base tool by means of pressure or a vacuum in such a way that the preform is soaked by the matrix material, and the preform soaked with the matrix material is maintained in a predetermined position and shape, while this preform is heated or cooled by the base tool, in order to thus cure. The base tool itself can either be directly heated or cooled or it can be indirectly heated or cooled by means of a separate heating device, in order to then transfer the heat or the cold to the preform.

The base tool includes a first tool part and a second tool part, wherein the second tool part can, in turn, comprise several parts. The first and second tool parts can be arranged relative to one another in a closed position and in an open position. In the closed position, the first and second tool parts enclose an internal space of the base tool, while in the open position the internal space is open to the surrounding environment, so as to position a preform in the internal space or remove a finished fiber composite workpiece from the internal space. In particular, the first tool part can be formed as a container with an aperture, and the second tool part as a lid, which seals the aperture.

The base tool is configured such that a preform, in particular a fiber fabric, can be mounted in the internal space and maintained in a predetermined shape and position there. The base tool includes a matrix connection or several matrix connections to convey matrix material into the internal space to the preform. Preferably, the base tool can include a vacuum connection or several vacuum connections to generate a vacuum in the internal space, in order to thus move the matrix material from the matrix connection through the internal space, in particular through or along the preform.

The holding device is configured to hold the base tool, in other words, the first tool part and the second tool part, in a relative closed position, while the matrix material is conveyed through the matrix connection into the internal space. Because, during introduction of matrix material into the internal space, pressure is exerted by the matrix material on the first and second tool parts, the holding device must press the first and second tool parts against one another with even greater pressure. The holding device can be formed as a press unit, in which the base tool is mounted or can be mounted. Alternatively, the holding device can, however, also be formed as a detachable fixing means on the first and second tool parts, which can be engaged with one another, for example by bolting together or locking.

When producing fiber composite workpieces using such an assembly, in particular in series production of fiber composite workpieces, the base tool must, after the production of each individual fiber composite workpiece, be cleaned of the matrix material left behind on the base workpiece. This cleaning process takes up time and involves additional cost. Furthermore, the assembly known from the prior art has the disadvantage that, when even small design changes are made to the fiber composite workpiece to be produced, an entirely new base tool must be employed, which is time-consuming and cost-intensive, and necessitates lengthy tool changeover times, during which time the assembly is idle and no fiber composite workpieces can be produced.

SUMMARY OF THE INVENTION

An objective of the present invention, therefore, is to provide an assembly for the production of a fiber composite workpiece that permits a more effective, in other words, a faster and more cost-efficient series production.

This objective is achieved by providing a tool insert, which is formed separate from the base tool. The tool insert is mounted in the internal space of the base tool or is adapted in order to be mounted in the internal space of the base tool. The tool insert additionally includes a cavity for accommodating a preform, and a shaping surface, facing the cavity, for maintaining the preform in a predetermined position and shape. The preform can either be introduced unformed into the cavity and conformed there to the shape of the shaping surface, or it can be introduced into the cavity in a shape already corresponding to the shaping surface, so that the shaping surface merely supports the shape of the preform. The outer contours of the tool insert are made to conform to the internal space of the base tool.

The tool insert can thus be exchanged following production of a fiber composite workpiece, while the base tool can again be used for the subsequent fiber composite workpiece to be produced. The tool insert can be designed for just a single use, in other words, it can be disposed of after use. Alternatively, the tool insert can, however, also be cleaned and subsequently re-used. In either case, the production process suffers no undesirable delays as a result of the cleaning and/or preparation of the base tool because, after each production of a fiber composite workpiece, only the last-used tool insert has to be removed and replaced with a new tool insert.

By means of such an individual tool insert, which is used individually for each fiber composite workpiece to be produced, minor design changes to the fiber composite workpiece can easily be made in the course of series production by making adjustments to the corresponding tool insert, without needing to adjust or exchange the base tool. The same applies to the production of similar fiber composite workpieces using the same base tool, which is likewise possible by means of just one adjustment of the corresponding tool insert. Furthermore, the occupancy time of the assembly, and thus the production cycles of the fiber composite workpieces, can be reduced in that, even while a first fiber composite workpiece is being produced in the assembly, a second tool insert having a preform mounted therein is being prepared in parallel, so that they can be mounted in the base tool immediately once the first fiber composite workpiece is finished and the associated tool insert is removed and the subsequent production process can commence in the base tool without delay.

The present invention thus envisages allocating the tasks of the tool known from the prior art, namely the transmission of force from the holding device to the workpiece to be produced, on the one hand, and the shaping and certain functionalities, for example, flow paths for the matrix material and connections for generation of a vacuum, on the other hand, to two components which are separated from one another, specifically to the base tool, on the one hand, which takes over the transmission of force from the press, and, on the other hand, to the tool insert, which ensures the shaping or shape retention of the preform or of the fiber composite workpiece to be produced, as well as certain functionalities, such as connections or flow paths. The base tool can, in principle, remain permanently in the holding device and has to be exchanged only in the case of very significant changes to the geometry of the fiber composite workpiece to be produced, while the tool insert is or can be individually provided for each fiber composite workpiece to be produced and is or can be adjusted if necessary. For the production of complex elements, it is also conceivable that several preforms are mounted in the tool insert and/or that the tool insert includes several sections which are separated from one another, which extend along the preform or the preforms next to one another.

In one preferred embodiment, the tool insert includes a first insert part and preferably a separately designed second insert part. It is particularly preferable that the shaping surface includes a first surface part and a second surface part, wherein the first surface part is provided on the first insert part, and the second surface part, on the second insert part. It is also particularly preferred that the first and second insert parts are mounted in the internal space of the base tool in such a way that the first and second surface parts face one another and enclose the cavity between them. The cavity corresponds to the shape of the fiber composite workpiece to be produced. The preform or the fiber composite workpiece to be produced is thus retained between the first and second insert parts, while the base tool is in the closed position and the production process is underway, that is to say that matrix material is conveyed to the preform and/or the preform soaked with matrix material cures.

Preferably, the first insert part is mounted in the first tool part and the second insert part is mounted in the second tool part. Alternatively, it is also possible, however, that the tool insert includes only a first insert part, which is mounted in the first tool part, whereas no insert part is mounted in the second tool part. The second tool part can then be designed in the manner known from the prior art, in other words, it itself includes a shaping surface facing the cavity or internal space, against which the preform and the fiber composite workpiece to be produced lie and are held.

Thus, when the preform is mounted in the base tool, initially the first insert part is mounted in the first tool part. Then the preform is mounted on the first surface part of the first insert part. Then the second insert part with the second surface part is set on the first preform and the first insert part, so that the second surface part lies against the surface of the preform, which surface faces the surface which lies against the first surface part. After this, the second tool part is set on the first tool part, so that it lies against the second insert part and applies pressure to the second insert part and thus to the entire tool insert and the preform mounted therein.

With such a two-part design of the tool insert, it is possible to quickly and easily produce particularly flat elements having two surfaces facing one another.

In one preferred embodiment, the tool insert includes a third insert part, which lies against the first insert part and supports it in relation to the base tool. Additionally or alternatively, the tool insert includes a fourth insert part, which lies against the second insert part and supports it in relation to the base tool. By means of such a third and/or fourth insert part, it is possible to support the first and/or second insert part, without it extending through the entire internal space, in other words, as far as the base tool. This can be helpful, for example, to allow the use of different materials or bodies for the first and third insert parts and/or for the second and fourth insert parts. Thus the first or second insert parts could be designed as solid bodies, while the third or fourth insert part is designed as a gas or water volume, for example. The first and/or second insert parts could also be exchanged after every production process, while the third and/or fourth insert parts would be re-used for another production process. In the context of the present invention, a "material" can be understood to mean not only a solid, but also a gas, or a liquid or combinations thereof.

It is particularly preferable that the first and/or the second insert part include an outer surface facing the first and/or second surface part, the shape of which corresponds to the first and/or second surface part. In other words, the first and/or second insert part are designed as a thin-walled element, which includes a surface lying against the preform or facing the cavity, and includes an outer surface facing this surface and lying against the third and/or fourth insert part, the shape or relative arrangement of the outer surface corresponding to that of the surface facing towards the preform or at least being similar to the relative arrangement thereof.

It is thus possible for the first and/or second insert part, which should be designed as solid bodies due to the contact with the preform or the matrix material, to simply be designed as a thin-walled shell, or even as a film, with minimum material costs, while the third and/or fourth insert part for the transmission of force between the base tool and the first and/or second insert part can be formed from any other material or substance, for example a gas, a liquid or a compacted pourable solid.

In another preferred embodiment, the first and the second insert parts are formed from a common first material. Alternatively, the first insert part can be formed from a first material and the second insert part, from a second material, wherein the first material and the second material are different from one another, wherein both materials, however, are a solid, for example a metal, a sintered metal, a ceramic material or a plastic material. Because the first insert part and the second insert part are in contact with the preform or the matrix material, the first material and the second material must be solids. Nevertheless, different solids can be used for the first insert part and the second insert part, depending on the requirements of the first surface part and the second surface part. For example, the first insert part and/or the second insert part can be formed from a film, which is then supported by the third and the fourth insert part in relation to the base tool.

It is particularly preferable that the third and the fourth insert part are formed from a common third material. Alternatively, the third insert part can also be formed from a third material and the fourth insert part, from a fourth material which is different from the third material. The third material and the fourth material can be a solid, a compacted pourable solid, a liquid or a gas, or a combination thereof, wherein the liquid or the gas can also be maintained in a compacted form, in other words, maintained in particular in a receptacle or can be in direct contact with the base tool. The only absolutely essential requirement is that the liquid or the gas is separated by means of a solid-type first or second insert part from the preform or the fiber composite workpiece to be produced. This can also be achieved by means of a first or second insert part in film form. In order to shape or retain the shape of the preform, however, at least one of the first to fourth insert parts must be formed from a rigid material which, besides a pure solid, can also, however, be a compacted, e.g., vacuumed, pourable solid. Examples of liquids and gases include oil, air and water vapor.

Both pourable solids and liquids or gases can be easily adapted to any shape, so that they are particularly well suited to support thin-walled first and/or second insert parts in relation to the base tool and to conform to their shapes. Furthermore, they can transfer pressure from the base tool in a very uniform manner onto the first and/or second insert part, and from there onto the fiber composite workpiece.

In another preferred embodiment, in the tool insert at least one matrix duct is provided to convey matrix material from the matrix connection to the cavity and/or along the cavity. By means of the matrix duct, the matrix material can reach the preform quickly and in a defined and uniform manner and disperse there. When the matrix duct is provided in the tool insert, it can be easily modified for different tools to be produced, without needing to exchange the base tool.

In yet another preferred embodiment, in the tool insert at least one heating duct and/or one cooling duct is provided to convey a heating medium and/or a cooling medium through the tool insert. This allows the fiber composite workpiece to be heated or cooled in order to cure it and the heating and/or cooling duct can be modified and thus adjusted to satisfy different requirements, without needing to exchange the base tool to do so.

According to yet another embodiment, the shaping surface of the tool insert is provided with at least one negative form for functional elements to be provided in the fiber composite workpiece to be produced. Such functional elements can, for example, be fixing elements such as drilled holes, etc. The functional elements can be produced easily and in a modifiable manner, in other words, differently for different fiber composite workpieces to be produced by means of the negative forms on the tool insert, without needing to provide different base tools.

In another preferred embodiment, a preparation device is provided, which is configured to hold the tool insert in such a way that the cavity is accessible and a preform can be positioned therein. The preparation device can be designed similar to the base tool, in other words, similar to the first and/or second tool part, so that the tool insert can be held therein, as it is subsequently in the base tool, while a preform can, in preparation for the next production step in the base tool, be mounted in the tool insert in a predetermined position and shape. In particular, the preparation device can be designed to mount and to hold the first insert part, in which the preform can then be mounted in a shape and position corresponding to the shaping surface or the first surface part, whereupon finally the second insert part is joined to the first insert part, so that the preform also lies against the second surface part and is encased between the first and second insert parts, to be thus introduced into the base tool for the subsequent production step. If a third and/or fourth insert part is also provided, then they can also be joined on the preparation device to the first and second insert parts.

Thus, while a first fiber composite workpiece is located in the base tool to carry out production, a preform for the production of a second fiber composite workpiece can be simultaneously prepared with the aid of the preparation device in such a way that this preform, mounted in the tool insert after removal of the finished first fiber composite workpiece, can be introduced directly into the base tool to carry out further production. The preparation device can be provided either on the base tool itself or on the holding device, or can be connected to them, or the preparation device can be formed separate from them.

Another aspect of the present invention relates to a method for the production of a fiber composite workpiece using an assembly as described above. According to the method, in a first step, an assembly according to one of the exemplary embodiments described above is provided. A preform is then introduced into the cavity in such a way that the preform is maintained in a predetermined position and shape by means of the shaping surface. Subsequently, the base tool is arranged in a closed position, so that the first tool part and the second tool part enclose the internal space. The first tool part and the second tool part are then held in a closed position by means of the holding device, while matrix material is simultaneously conveyed through the matrix connection to the preform, respectively the cavity. This can take place in such a way that a vacuum is generated in the cavity by means of a vacuum connection and the matrix material is sucked out of the matrix connection into the cavity, where it saturates the preform. In order to cure the preform saturated with matrix material, this preform can then preferably be exposed to a predetermined temperature, in other words, it can be heated or cooled. To achieve the heating or cooling, heating or cooling medium can be conveyed through a heating or cooling duct, which can also be provided in the tool insert. Likewise, to cure the preform saturated with matrix material, this preform can then be exposed to a predetermined pressure, which pressure can be produced by pressure from matrix material via the matrix connection and simultaneous closure of the vacuum connection and the clamping together of the two tool parts by means of the holding device.

Preferably, in parallel to this and to prepare for the production of another fiber composite workpiece, another tool insert can be mounted in the preparation device according to a previously described exemplary embodiment, and another preform can be introduced into the cavity of the other tool insert, so that the prepared other preform together with the other tool insert can be mounted in the base tool, as soon as the preceding finished fiber composite workpiece has been removed from the base tool.

BRIEF DESCRIPTION OF THE DRAWINGS

Five exemplary embodiments of the present invention are described in greater detail below by reference to drawings. The drawings show in FIG. 1 an exemplary embodiment of the assembly according to the invention with a two-part tool insert having a first insert part and a second insert part, FIG. 2 a second exemplary embodiment of the assembly according to the invention with a four-part tool insert having a first, second, third and fourth insert part, FIG. 3 a third exemplary embodiment of the assembly according to the invention with a four-part tool insert, wherein the first and second insert parts comprise thin-walled shell parts, FIG. 4 a fourth exemplary embodiment of the assembly according to the invention, wherein the third and fourth insert parts are formed from different materials, FIG. 5 a fifth exemplary embodiment of the assembly according to the invention, wherein the first insert part includes heating and cooling ducts.

DETAILED DESCRIPTION OF THE PREFERRED EMBODIMENTS

Figure 1:
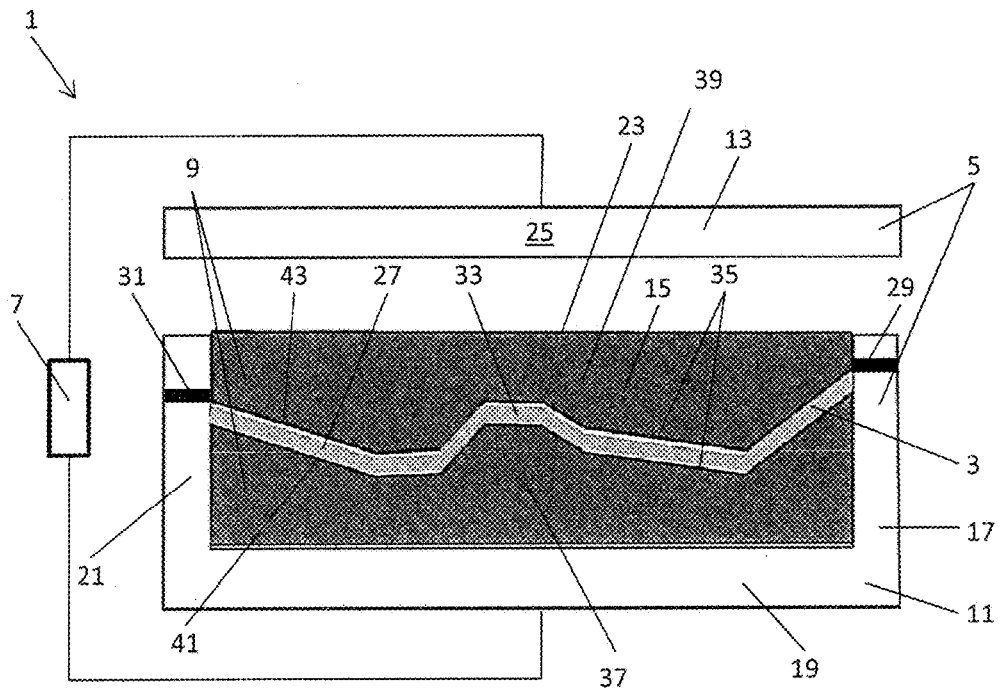

FIG. 1 depicts an exemplary embodiment of the assembly 1 according to the invention for the production of a fiber composite workpiece 3 using a resin transfer molding process. The assembly 1 comprises a base tool 5, a holding device 7 and a tool insert 9.

The base tool 5 includes a first tool part 11 and a second tool part 13. The first tool part 11 and the second tool part 13 can be arranged relative to one another in a closed position or in an open position. In the closed position, the first and second tool parts 11, 13 enclose an internal space 15, while in the open position the internal space 15 is open to the surrounding environment. In the present exemplary embodiment, the first tool part 11 is designed as a container 17 having a base 19 and side walls 21 which face one another, and it includes an aperture 23 opposite the base 19. The second tool part 13 is designed as a lid 25 which, in the closed position of the base tool 5, seals the aperture 23 of the first tool part 11. The base tool 5 is designed such that, with the aid of the tool insert 9, a preform 27 can be mounted in the internal space 15 and maintained in a predetermined shape and position there. Furthermore, the base tool 5, in the present exemplary embodiment the first tool part 11, includes a matrix connection 29 to convey matrix material into the internal space 15 to the mounted preform 27. The base tool 5, in the present exemplary embodiment the first tool part 11, also includes a vacuum connection 31 to generate a vacuum in the internal space 15 and, thus, to suck in matrix material from the matrix connection 29.

The holding device 7 is designed in the present exemplary embodiment as a press unit and it is designed to accommodate the base tool 5 and to hold the first tool part 11 and the second tool part 13 in the closed position relative to one another, while matrix material is conveyed through the matrix connection 29 into the internal space 15.

The tool insert 9 is designed separate from the base tool 5 and is mounted in the internal space 15 of the base tool 5. The tool insert 9 includes a cavity 33 for accommodating a preform 27 and a shaping surface 35, facing the cavity 33, for maintaining the preform 27 in a predetermined shape. In the present exemplary embodiment, the tool insert 9 is designed such that it includes a first insert part 37 and a separate second insert part 39. The shaping surface 35 includes a first surface part 41 and a second surface part 43, wherein the first surface part 41 is provided on the first insert part 37, and the second surface part 43, on the second insert part 39. The first and second insert parts 37, 39 are mounted in the internal space 15 of the base tool 5 in such a way that the first and second surface parts 41, 43 face one another and enclose the cavity 33 between them. The cavity 33 corresponds to the shape of the fiber composite workpiece 3 to be produced, in the present exemplary embodiment, a thin-walled flat structure.

In the present exemplary embodiment, the first and the second insert parts 37, 39 are formed from a common first material, which is a solid, for example a metal, a sintered metal, a plastic material or a ceramic material.

Figure 2:
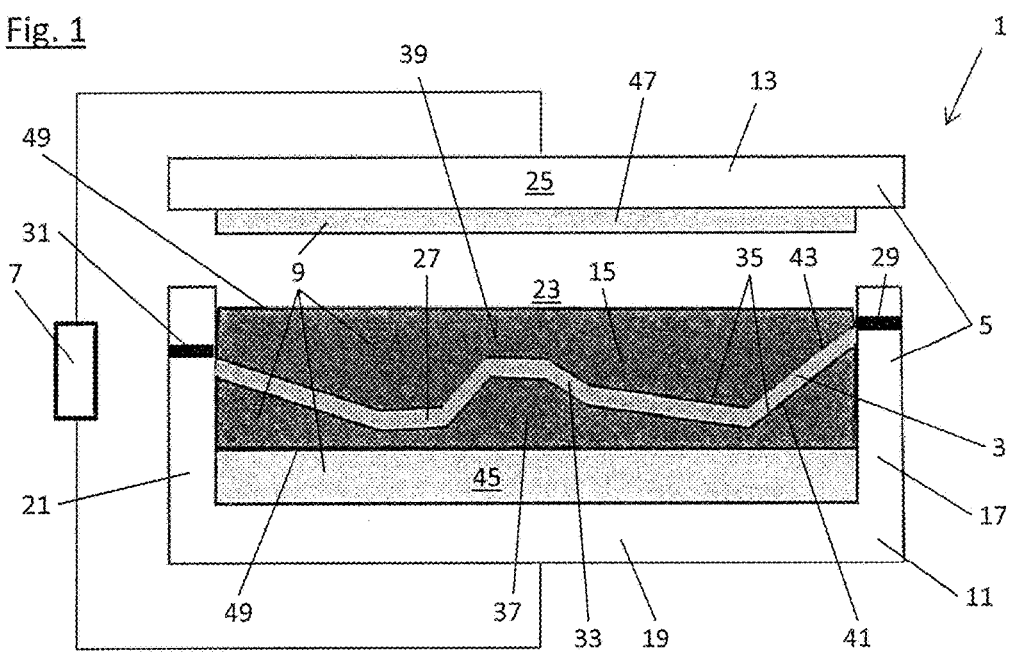

FIG. 2 depicts a second exemplary embodiment of the assembly 1 according to the invention for the production of a fiber composite workpiece 3, which assembly is designed similar to the assembly 1 of FIG. 1, so that matching features are given the same reference numbers. The exemplary embodiment of FIG. 2 differs from the exemplary embodiment of FIG. 1 in that the tool insert 9 includes a third insert part 45 and a fourth insert part 47. The third insert part 45 lies against the first insert part 37 and supports it in relation to the base tool 5. At the same time, the fourth insert part 47 lies against the second insert part 39 and supports it in relation to the base tool 5. Thanks to such a divided design of the tool insert 9, different materials can be used for the first and second insert parts 37, 39 and for the third and fourth insert parts 45, 47. In the present exemplary embodiment, the third and the fourth insert parts 45, 47 are formed from a common third material which, in the present case, is a compacted liquid, for example an oil, or a liquid volume. The first and the second insert part 37, 39 are formed from a common first material which, in the present case, is a solid, for example a metal, a sintered metal, a plastic material or a ceramic material.

Figure 3:
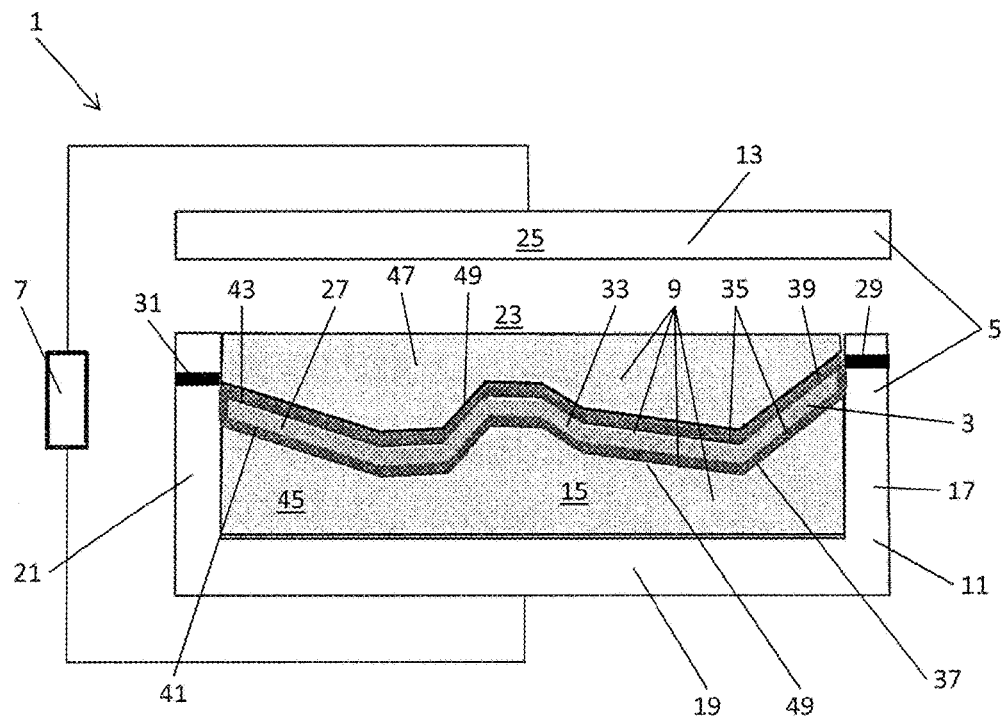

FIG. 3 depicts a third exemplary embodiment of the assembly 1 according to the invention for the production of a fiber composite workpiece 3, which assembly is designed similar to the assembly 1 of FIG. 2, so that matching features are given the same reference numbers. The assembly 1 of FIG. 3 differs from the assembly 1 of FIG. 2 in that the first and the second insert parts 37, 39 include an outer surface 49 facing the first and the second surface parts 41, 43, the shape of which corresponds to the first and second surface parts 41, 43 and against which the third and fourth insert parts 45, 47 lie. The first and second insert parts 37, 39 are designed as a thin-walled structure made of a solid, for example a film, while the third and fourth insert parts 45, 47 are designed as compacted pourable solids, which support in relation to the base tool 5 the first and second insert parts 37, 39 on their outer surface 49 facing away from the cavity 33 and thus from the fiber composite workpiece 3 to be produced and, in the case of first and second insert parts 37, 39 designed as flexible film, also retain the shape of the preform.

Figure 4:
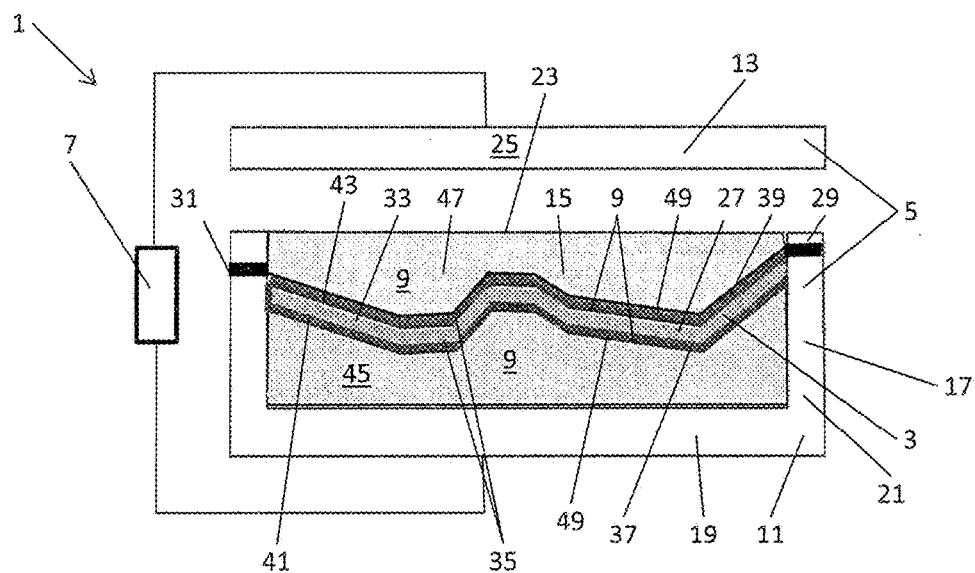

FIG. 4 depicts a fourth exemplary embodiment of the assembly 1 according to the invention for the production of a fiber composite workpiece 3, which assembly is designed similar to the assembly 1 of FIG. 3, so that matching features are given the same reference numbers. The assembly 1 of FIG. 4 differs from the assembly 1 of FIG. 3 in that the third insert part 45 and the fourth insert part 47 are formed from different materials. In the present case, the third insert part 45 is formed by a vacuumed pourable solid, while the fourth insert part 47 is formed by a compacted liquid.

Figure 5:
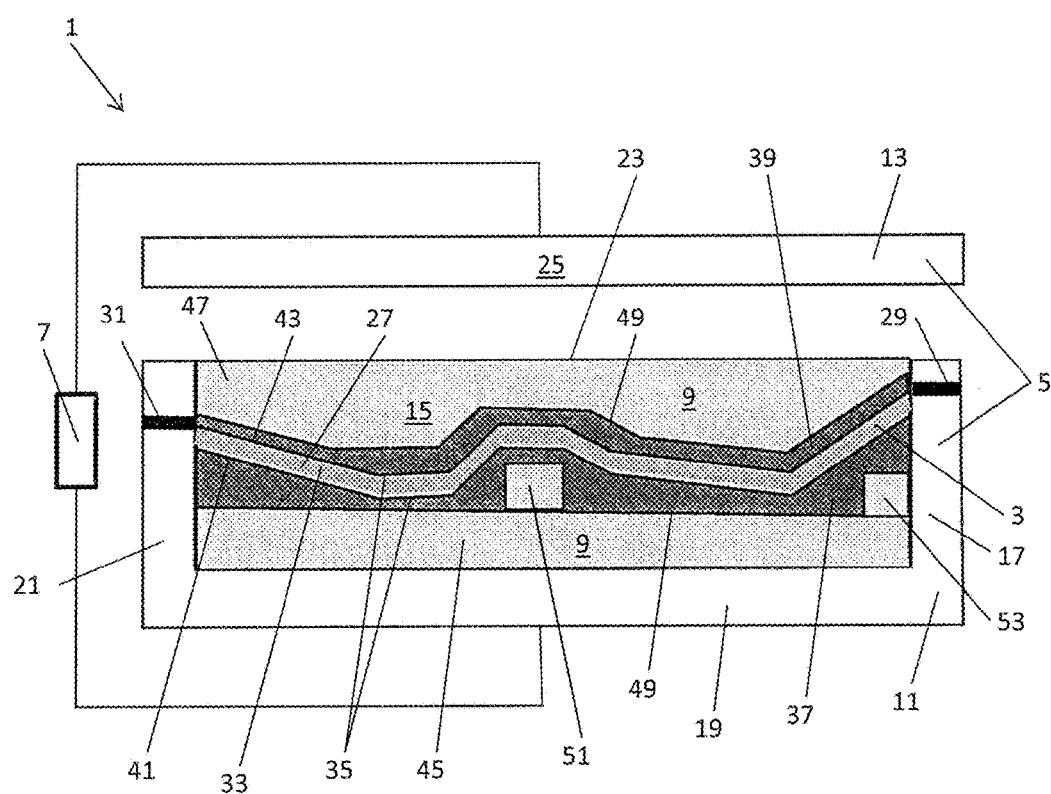

FIG. 5 depicts a fifth exemplary embodiment of the assembly 1 according to the invention for the production of a fiber composite workpiece 3, which assembly is designed similar to the assembly 1 of FIG. 4, so that matching features are given the same reference numbers. The assembly 1 of FIG. 5 differs from the assembly 1 of FIG. 4 in that the first insert part 37 is provided with a heating and cooling duct 51 to convey a heating and cooling medium through the tool insert 9. In this way, the preform 27 supplied with matrix material or the fiber composite workpiece 3 to be produced can be heated or cooled via the tool insert 9 so as to cure it. Furthermore, the first insert part 37 is provided with a matrix duct 53 to convey matrix material from the matrix connection 29 through the tool insert 9 to the preform 27 in the cavity 33.

With an assembly 1 according to one of the exemplary embodiments described above, a fiber composite workpiece 3 can be produced in the following way:

Firstly, an assembly 1 according to one of the exemplary embodiments described above is provided. A preform 27 is then introduced into the cavity 33 in such a way that the preform 27 is maintained by means of the shaping surface 35 in a predetermined position and shape, namely in the shape in which the fiber composite workpiece 3 is to be produced. The base tool 5 is then arranged in a closed position, wherein the second tool part 13 is moved onto the aperture 23 of the first tool part 11. With the aid of the holding device 7, the first tool part 11 and the second tool part 13 are then held in a closed position and, subsequent to or during this process, matrix material is conveyed through the matrix connection 29 to the preform 27, to disperse there. In order to suck in the matrix material and to disperse it at the preform 27, a vacuum is generated in the cavity 33 by means of a vacuum connection 31 in the tool insert 9. When the preform 27 is completely soaked with matrix material, in other words, when the cavity 33 is completely filled with matrix material and the preform 27, in order to cure the matrix material, a heating or cooling medium is conveyed through the heating and cooling duct 51, so as to thus influence the temperature of the matrix material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for the production of a fiber composite workpiece comprising:
    a base tool, which includes a first tool part and a second tool part,
    wherein the first and second tool parts can be arranged relative to one another in a closed position, in which they enclose an internal space, and in an open position, in which the internal space is open to a surrounding environment,
    wherein the base tool is configured in such a way that a preform can be mounted in the internal space and maintained in a predetermined shape there, and
    wherein the base tool includes a matrix connection to convey matrix material into the internal space,
    a holding device, which is configured to hold the first tool part and the second tool part, in a relative closed position, and
    a tool insert formed separate from the base tool,
    wherein the tool insert is mounted in an internal space of the base tool, and
    wherein the tool insert includes a cavity for accommodating a preform, and a shaping surface that faces the cavity, for maintaining the preform in a predetermined shape;
    wherein the tool insert includes a first insert part and a second insert part,
    wherein the shaping surface includes a first surface part and a second surface part,
    wherein the first surface part is provided on the first insert part, and the second surface part is provided on the second insert part,
    wherein the first and second insert parts are mounted in the internal space of the base tool in such a way that the first and second surface parts face one another and enclose the cavity between them, wherein the cavity corresponds to the shape of the fiber composite workpiece to be produced,
    wherein the tool insert includes at least one of a third insert part and a fourth insert part, the third insert part lying against the first insert part and supporting the first insert part in relation to the base tool, and the fourth insert part lying against the second insert part and supporting the second insert part in relation to the base tool.

2. The assembly according to claim 1, wherein at least one of the first and the second insert part include an outer surface facing at least one of the first and second surface part, the shape of the outer surface corresponding to the at least one of the first and second surface part.

3. The assembly according to claim 1, wherein the first and second insert parts are formed from a first material and a second material, respectively, which is one of the same as or different from the other, and
    wherein the first material and the second material are both a solid.

4. The assembly according to claim 1, wherein the third and the fourth insert parts are formed from a third material and a fourth material, respectively, which is one of the same as or different from the other, and wherein the third material and the fourth material are each one of a solid, a compacted pourable solid, a liquid or a gas, or a combination thereof.

5. The assembly according to claim 1, wherein, in the tool insert, a matrix duct is provided to convey matrix material from the matrix connection either to or along the cavity, or both.

6. The assembly according to claim 1, wherein, in the tool insert, a duct is provided to convey one or more of a heating medium and a cooling medium through the tool insert.

7. The assembly according to claim 1, wherein the shaping surface is provided with negative forms for functional elements to be provided in the fiber composite workpiece to be produced.

8. The assembly according to claim 1, wherein a preparation device is provided, which is configured to hold the tool insert in such a way that the cavity is accessible and a preform can be introduced therein.

* * * * *